United States Patent

Lambert

Patent Number: 5,823,576
Date of Patent: Oct. 20, 1998

[54] COPY-RESISTANT DOCUMENT

[75] Inventor: Lew Lambert, 11938 Cedar Grey St., San Antonio, Tex. 78249

[73] Assignee: Lew Lambert, San Antonio, Tex.

[21] Appl. No.: 238,812

[22] Filed: May 6, 1994

[51] Int. Cl.$^6$ .................................................. B42D 15/00
[52] U.S. Cl. ............................... 283/93; 283/72; 283/902
[58] Field of Search .................... 283/901, 902, 283/57, 58, 93, 114, 72

[56] References Cited

U.S. PATENT DOCUMENTS

| | | |
|---|---|---|
| 1,457,805 | 6/1923 | Woodnull . |
| 3,713,861 | 1/1973 | Sharp ........................................ 117/15 |
| 3,852,088 | 12/1974 | Godlewski et al. ........................ 117/1 |
| 3,887,742 | 6/1975 | Reinnagel ................................. 428/211 |
| 4,066,280 | 1/1978 | LaCapria ................................. 283/8 R |
| 4,118,122 | 10/1978 | Rees et al. ............................... 355/77 |
| 4,168,088 | 9/1979 | Somlyody ................................. 283/8 R |
| 4,175,776 | 11/1979 | Ranauro ................................... 283/8 B |
| 4,210,346 | 7/1980 | Mowry, Jr. et al. ...................... 283/8 B |
| 4,227,719 | 10/1980 | McElligott et al. ...................... 283/8 R |
| 4,227,720 | 10/1980 | Mowry, Jr. et al. ...................... 283/8 R |
| 4,265,469 | 5/1981 | Mowry, Jr. et al. ...................... 283/8 B |
| 4,277,514 | 7/1981 | Sugiura et al. ............................. 427/1 |
| 4,303,307 | 12/1981 | Tureck et al. ........................ 350/276 R |
| 4,310,180 | 1/1982 | Mowry, Jr. et al. ...................... 283/8 B |
| 4,325,981 | 4/1982 | Sugiura et al. ............................. 427/7 |
| 4,341,404 | 7/1982 | Mowry, Jr. et al. ...................... 283/8 B |
| 4,351,547 | 9/1982 | Brooks, II ................................ 283/8 R |
| 4,420,175 | 12/1983 | Mowry, Jr. ................................. 283/93 |
| 4,522,429 | 6/1985 | Gardner et al. ............................ 283/91 |
| 4,536,016 | 8/1985 | Solomon et al. ......................... 283/111 |
| 4,578,298 | 3/1986 | Nagafuchi ................................. 428/40 |
| 4,579,370 | 4/1986 | Corwin et al. ............................. 283/72 |
| 4,786,084 | 11/1988 | Karney et al. ............................. 283/91 |
| 4,867,481 | 9/1989 | Gundjian ................................... 283/91 |
| 4,884,828 | 12/1989 | Burnham et al. .......................... 283/89 |
| 5,018,767 | 5/1991 | Wicker ....................................... 283/67 |
| 5,087,507 | 2/1992 | Heinzer ................................... 428/195 |
| 5,106,125 | 4/1992 | Antes ......................................... 283/91 |
| 5,171,040 | 12/1992 | Orndorff ................................... 283/93 |
| 5,193,853 | 3/1993 | Wicker ...................................... 283/85 |
| 5,271,644 | 12/1993 | Merry et al. ............................... 283/85 |
| 5,271,645 | 12/1993 | Wicker ....................................... 283/92 |

FOREIGN PATENT DOCUMENTS

| | | |
|---|---|---|
| 2646183 | 10/1990 | France . |
| 3921636 | 1/1991 | Germany . |
| 224240 | 5/1990 | United Kingdom . |

OTHER PUBLICATIONS

Brochure, "The Facts of Security Printing," circa 1992.
Niquette, et al., 1976.
Xerox Ccrporation, "Methods and Techniques to Recommend to Prevent Color Copy Counterfeiting on the Xerox 6500", Mar. 1977.

*Primary Examiner*—Willmon Fridie, Jr.
*Attorney, Agent, or Firm*—D'Alessandro & Ritchie

[57] ABSTRACT

A document that resists copying by ordinary color copiers and color scanners. An area that is printed with color dots using a gradient print screen that exceeds resolutions available on commonly available color copiers and color scanners. The area may therefore comprise lighter regions (having fewer screen lines per inch) and darker regions (having more screen lines per inch). Multiple colors may be printed with different gradient print screens, and regions which are darker or lighter for a first color may or may not be darker or lighter for a second color. The document may also comprise a second area that is printed with a moiré pattern. The moiré pattern may be generated by adjusting an angle between a pair of print screens, such as a pair of gradient print screens. A set of colors for printing may avoid common printing ink colors, may prefer yellow, light green, or light blue, and may avoid red, purple, or violet, to raise the difficulty in copying by color copiers or color scanners. A top layer of the area may be covered with a layer of matte varnish or transparent white ink.

4 Claims, 2 Drawing Sheets

COPY-RESISTANT DOCUMENT

BACKGROUND OF THE INVENTION

1. Field of the Invention

This invention relates to documents that resist copying by ordinary color copiers and color scanners, particularly checks and the like.

2. Description of Related Art

The development of photocopying and related processes has made it easier to copy documents, even those documents that it is improper to copy, such as checks and securities. This has led to the development, by printers and issuers of such documents, of various methods of protection from copying. These various methods have included foil seals affixed to the document, fluorescent ink, and microprinting. These various methods have also included printing with colors and inks that are difficult to copy, due to differential response to the color or ink by copiers and by the human eye.

While these methods of the prior art generally achieve the purpose of making it difficult to make accurate copies of certain documents, they tend to suffer from certain drawbacks. One drawback is expense. This drawback may make these methods unsuitable for printing inexpensive documents such as checks. Another drawback is that the copy may still be sufficiently similar to the original that a casual observer may not notice due to lack of careful scrutiny. This drawback is also unsuitable for documents that are processed quickly, such as checks.

A third drawback is that the development of color photocopying, color scanners, and related processes and equipment continues apace. Each method for defeating copying has been met with an advance in the technology commonly available to the public. Thus methods that depend on the inability of color photocopiers and color scanners are generally short-lived; the problem will only get worse.

It would be advantageous to provide an inexpensive method for printing checks or other securities that would be difficult to copy with commonly-available equipment, that would be easy to spot by even a casual review of a false document, and that can be improved in tandem with improvements in the technology that is commonly available for copying.

The following patents may be related art: 1,457,805; 3,713,861; 3,852,088; 3,887,742; 4,066,280; 4,118,122; 4,168,088; 4,175,776; 4,210,346; 4,227,719; 4,227,720; 4,265,469; 4,277,514; 4,303,307; 4,310,180; 4,325,981; 4,341,404; 4,351,547; 4,420,175; 4,786,084; 4,522,429; 4,536,016; 4,578,298; 4,579,370; 4,867,481; 4,884,828; 5,018,767; 5,087,507; 5,106,125; 5,171,040; 5,193,853; 5,271,644; 5,271,645; DE 3 921 636 A; FR 2 646 183 A; GB 2 224 240 A.

Accordingly, it is an object of the invention to provide a document that resists copying by ordinary color copiers and color scanners.

SUMMARY OF THE INVENTION

The invention provides a document that resists copying by ordinary color copiers and color scanners.

In a preferred embodiment, a document comprises an area that is printed with color dots using a gradient print screen that exceeds the resolutions available on commonly available color copiers and color scanners. The area may therefore comprise lighter regions (having fewer screen lines per inch) and darker regions (having more screen lines per inch). In a preferred embodiment, multiple colors may be printed with different gradient print screens, and regions which are darker or lighter for a first color may or may not be darker or lighter for a second color.

The document may also comprise a second area that is printed with a moiré pattern. The moiré pattern may be generated by adjusting an angle between a pair of print screens, such as a pair of gradient print screens.

In a preferred embodiment, a set of colors for printing may avoid common printing ink colors, may prefer yellow, light green, or light blue, and may avoid red, purple, or violet, to raise the difficulty in copying by color copiers or color scanners. In a preferred embodiment, a top layer of the area may be covered with a layer of matte varnish or transparent white ink.

Accordingly, the invention provides an inexpensive method for printing checks or other securities that is difficult to copy with commonly-available equipment and that is easy to spot by even a casual review of a false document.

Although this invention makes use of the low resolution of color photocopying devices and color scanners that are commonly available, it is expected that the resolution of professional printing devices will continue to exceed that of commonly available copying devices. Accordingly, it is expected that the invention will continue to work despite advances in technology.

DESCRIPTION OF THE PREFERRED EMBODIMENT

Figure 1A:
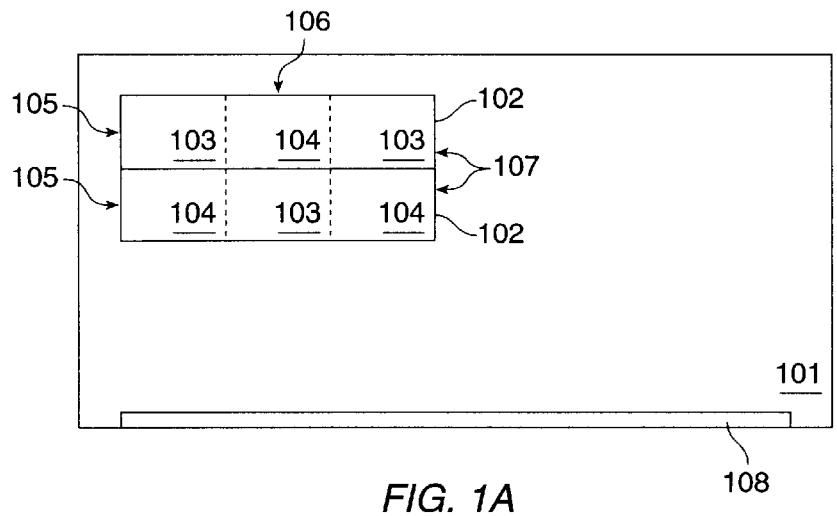
FIG. 1 shows the face of a document that resists copying, and a copy thereof.
Figure 1B:
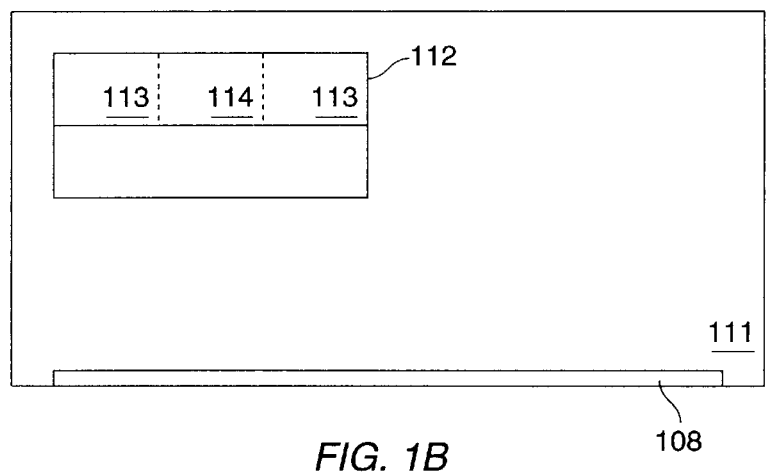

FIG. 1 shows the face of a document that resists copying, and a copy thereof.

A document 101, such as a check, is constructed to resist copying by commonly available copying processes, such as color photocopying or color scanning.

It is assumed herein that color photocopying devices and color scanning devices are available to the casual or "small time" forger, but that these devices have only a limited resolution. At the time of this application, the resolution of color photocopying devices is generally less than about 100 lines per inch (about 254 microns per line) and the resolution of color scanners is generally less than about 110 lines per inch (about 231 microns per line). While devices are available that have higher resolution, these are generally more expensive and less commonly available to the public.

Although this invention makes use of the low resolution of color photocopying devices and color scanners that are commonly available, those skilled in the art would recognize, after perusal of this application, that the invention could also be applied when the state of the art advances and the resolution of color photocopying devices and color scanners that are commonly available is improved. It is expected that the resolution of professional printing devices will continue to exceed that of commonly available copying devices. Accordingly, the discussion herein may be easily generalized to higher resolutions as they become available.

The document 101 comprises an area 102 that is printed with color dots using a gradient print screen that exceeds the resolutions available on commonly available color copiers and color scanners. As described herein, a gradient print screen has a resolution that varies with position on the document 101. In a preferred embodiment, the resolution of the gradient print screen used to print the area 102 may vary from about 80 lines per inch (about 318 microns per line) to about 120 lines per inch (about 212 microns per line). As a result, the area 102 may therefore comprise lighter regions 103 (having fewer screen lines per inch) and darker regions 104 (having more screen lines per inch). Because the human eye integrates the color dots together, when viewed by an observer, the document 101 will appear to have a continuous band of color in the area 102 that fades smoothly from a richer or more saturated hue to a paler or more depleted hue.

In a preferred embodiment, the gradient print screen may vary from a first finer and darker region at one end 105 of the area 102, to a coarser and lighter region in the middle 106 of the area 102, to a second finer and darker region at another end 107 of the area 102.

When copied with a commonly available color photocopier or scanned with a commonly available color scanner, the fine resolution will be lost. A copy 111 of the document 101 will have a copied area 112 corresponding to the printed area 102 of the original document 101, but the copied area 112 will not have the configuration of color dots found in the original area 102. Rather, the copied area 112 will have a relatively coarse printing of color dots. In those regions 113 of the copied area 112 corresponding to the darker regions 103 of the original area 102, the copy 111 will exhibit color, but in those regions 114 of the copied area 112 corresponding to the lighter regions 104 of the original area 102, the copy will exhibit no color, because the integrating capability of the color photocopier or color scanner is less precise than the human eye.

Accordingly, the copy 111 will be easily distinguishable from the original document. In a preferred embodiment, the original document 101 may have a printed legend 108 describing the proper appearance of the area 102, so that recipients of the copy 111 are reminded to observe the area 102.

In a preferred embodiment, the document may comprise a second area 102 that is printed with a gradient print screen, but with a second color different from the first color used for the first area 102. The second area 102 will therefore also have darker regions 103 and lighter regions 104. In a preferred embodiment, the second area 102 may vary from a first coarser and lighter region at one end 105 of the second area 102, to a finer and darker region in the middle 106 of the second area 102, to a second coarser and lighter region at another end 107 of the second area 102.

The second area 102 may be placed anywhere on the document 101, such as adjacent to the first area 102, overlapping the first area 102, or another position. When the second area 102 overlaps the first area 102, the print screens should be disposed so that a second set of color dots from the second gradient print screen do not completely obliterate a first set of color dots from the first gradient print screen. Partial obliteration is described herein with reference to moiré patterns.

Because the human eye integrates the color dots together, when viewed by an observer, the document 101 will appear to have a region of mixed color where the first set of color dots and the second set of color dots are intermingled. The region of mixed color will generally appear as a continuous band of a third color, different from the first color and the second color. For example, if the first area 102 is printed in yellow and the second area 102 is printed in blue, a region where the first area 102 and the second area 102 overlap will appear to an observer to be green.

Those skilled in the art will recognize, after perusal of this application, that there may be third, fourth, and further areas 102 on the document 101 printed with gradient print screens and having relatively darker regions 103 and relatively lighter regions 104 therein. The relatively darker regions 103 and relatively lighter regions 104 may take on any order, orientation, or combination, and may be placed in any position relative to the first area 102. All of these orders, orientations, and combinations are within the scope and spirit of the invention.

For example, an area 102 may be printed with a gradient print screen that varies in resolution in both a horizontal and vertical direction. For example, this gradient print screen may vary from about 200 microns per line to about 300 microns per line in the horizontal direction, while simultaneously varying from about 200 microns per line to about 300 microns per line in the vertical direction.

PRINTING DOCUMENTS USING GRADIENT PRINT SCREENS

Figure 2:
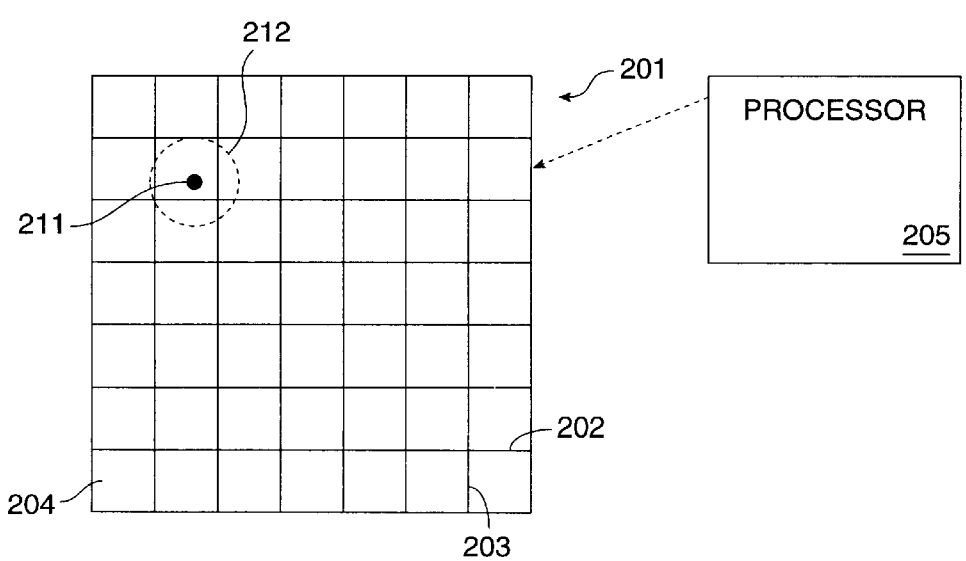
FIG. 2 shows a gradient print screen for printing documents, and a flying spot used by a color copier.

FIG. 2 shows a gradient print screen for printing documents, and a flying spot used by a color copier.

In a preferred embodiment, a gradient print screen 201 is aligned with the area 102 in the document 101 that is to be printed. The gradient print screen 201 comprises a sequence of horizontal screen lines 202 and a sequence of vertical screen lines 203 that block printing, and a defined set of open blocks 204 in a gradient print pattern where ink is deposited onto the document 101 and the document 101 is therefore printed.

Professional printing equipment for print screen printing generally includes a print screen 201 and a processor 205 (operating under software control) that may adjust the screen lines 202, 203, for printing. In a preferred embodiment, the screen lines 202, 203, may be adjusted individually or in groups. To configure a gradient print screen 201 with a horizontal resolution gradient, the processor 205 may follow a procedure like the following:

1. The processor 205 may position a first horizontal screen line 202 on the document 101. For example, the processor 205 may position the first horizontal screen line 202 at 100,000 microns (about four inches) from the edge of the document 101.

2. The processor 205 may then determine a distance from the first horizontal screen line 202 to a second horizontal screen line 202, in response to an initial resolution, and may position the second horizontal screen line 202 in response to the position of the first horizontal screen line 202 and the computed distance. For example, the processor 205 may position the second horizontal screen line 202 at 100,254 microns from the edge of the page (about 0.01 inches from the first horizontal screen line 202).

3. The processor 205 may then determine a distance from the second horizontal screen line 202 to a third horizontal screen line 202, in response to the initial resolution, a final resolution, and a distance on the document 101 in which the gradient resolution is to change from the initial resolution to the final resolution. For example, if the initial resolution is 254 microns (about 0.01 inches) per horizontal screen line 202, the final resolution is 508 microns (about 0.02 inches) per horizontal screen line 202, and the distance is 4,191 microns (about 0.165 inches), the processor 205 may add approximately 25.4 microns (about 0.001 inches) to the distance at each horizontal screen line 202. In this example, the distances between horizontal screen lines in microns would be 254, 279.4, 304.8, 330.2, 355.6, 381, 406.4, 431.8, 457.2, 482.6, and 508, for a total distance of 4,191 microns. The processor 205 may repeat this step until the entire gradient print screen 201 has been configured.

Alternatively, the processor 205 may determine the distance from the second horizontal screen line 202 to the third horizontal screen line 202 by repeating the distance from the first horizontal screen line 202 to the second horizontal screen line 202 for a selected distance, such as 0.05 inches (about 1,270 microns). After a number of horizontal screen lines 202 have been placed so that the selected distance is covered, the processor 205 may determine a new distance between horizontal screen lines 202 and repeat that new distance for a selected distance, such as 0.05 inches.

4. The processor 205 may also configure the gradient print screen 201 with a vertical resolution gradient, by performing a similar process with regard to vertical screen lines 203.

After the gradient print screen 201 is configured, the document 101 may be printed using the gradient print screen 201. Color dots will be printed on the document in the defined set of open blocks 204 in a gradient print pattern that results from the operation of the gradient print screen 201.

Those skilled in the art will recognize, after perusal of this application, that configuring the processor 205 in response to the disclosure of its functions herein would be workable without undue experimentation, and that detailed disclosure of the operation of the processor 205 is not required. Processors 205 for controlling print screens for printing are known in the art.

Color photocopiers and color scanners generally use a "flying spot" method of scanning and copying. When a color photocopier or color scanner is used to copy the document 101, a flying spot 211 may sample a spot 212 of the document and determine what is printed there. There are many related processes that use flying spots, in which the flying spot may comprise a collimated light beam, a laser, an electron beam or other ion beam, or some other technique. However, those skilled in the art will recognize, after perusal of this application, that while there are many different related processes used by color photocopiers and color scanners, the invention is generally workable with regard to substantially all of them, and that protection against all of them is within the scope and spirit of the invention.

The spot 212 of the document 101 that is sampled is generally larger than the finest resolution that the processor 205 can produce for the gradient print screen 201, and certainly larger than the fine adjustments the processor 205 may make for individual screen lines 202, 203, of the gradient print screen 201. Accordingly, the spot 212 that is sampled will generally comprise an average of the brightness, hue, and other visual qualities of the spot 212, rather than a detailed duplicate of the actual printed color dots.

Accordingly, the copy 111 produced by a color photocopier or color scanner (for the latter, after printing, for example by a laser printer or color printer) will not be a faithful duplicate of the original document 101. Specifically, the smooth color gradient produced by the gradient print screen 201 will not be duplicated. Instead of a darker region 103 and a lighter region 104, the copy 111 will generally have a first region 113 in which the color is saturated and a second region 114 in which the color is completely absent.

MOIRÉ PATTERNS

Figure 3:
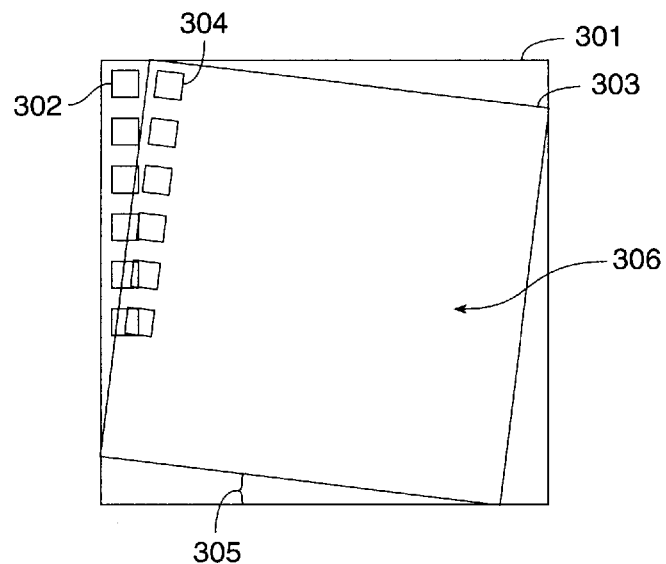
FIG. 3 shows a moiré pattern generated by two print screens disposed at a nonstandard angle.

FIG. 3 shows a moiré pattern generated by two print screens disposed at a nonstandard angle.

When a document 101 is printed using a first print screen 301, a first set of color dots 302 is printed on the document 101 on the set of open blocks 204 in a print pattern defined by that first print screen 301. When the document is thereafter printed using a second print screen 303, a second set of color dots 304 is printed on the document 101 on the set of open blocks 204 in a print pattern defined by that second print screen 303.

In known printing methods, such as four-color printing, the first print screen 301 and the second print screen 303 are typically aligned with an angle 305 that is substantially equal to a multiple of 15°. In four-color printing, the four print screens 301 for cyan, black, magenta, and yellow will typically be aligned at relative angles of 15°, 45°, 75°, and 90°.

When the first print screen 301 and the second print screen 303 are aligned with a substantially nonstandard angle 305, the first set of color dots 302 and the second set of color dots 304 form a moiré pattern 306. In a preferred embodiment, the nonstandard angle may vary from about 2–13° greater or less than a multiple of 15°. A moiré pattern 306 may be formed when the first set of color dots 302 and the second set of color dots 304 are the same color, but the description herein generally relates to the case where the first set of color dots 302 and the second set of color dots 304 are different colors.

Particularly when the angle 305 is only slightly nonstandard, e.g., about 2–3° greater or less than a standard angle, the moiré pattern will be readily distinguishable to the human eye, but not to the flying spot technique used by color copiers and color scanners. Accordingly, when the moiré pattern 306 in the document 101 is copied, the copy 111 will comprise a corresponding region that is readily observable to not be a moiré pattern. Rather, the corresponding region in the copy 111 will generally be a pattern that appears miscopied. In practice, many color copiers and color scanners have control processes or software that deliberately filters out moiré patterns, and refuses to copy them. These color copiers and color scanners will produce a corresponding region in the copy that is blank.

A moiré pattern 306 may also be printed when the first print screen 301 or the second print screen 303, or both, are gradient print screens. Alternatively, the moiré pattern 306 may be overlapped with the area 102 printed using a gradient print screen 201.

A moiré pattern 306 may also be printed by gradient alteration of the angles of the screen lines 202, 203, to produce a gradient angle print screen. When the document 101 is printed, the gradient angle print screen will produce a gradient angle print pattern. To configure a gradient angle print pattern, the processor 205 would proceed in like manner as the process described with regard to FIG. 2, except that each screen line 202, 203, would be configured at a slightly different angle from its neighboring screen line, rather than a slightly different distance from its neighboring screen line. A moiré pattern 306 may therefore be printed when the first print screen 301 or the second print screen 303, or both, are gradient angle print screens.

ADDITIONAL SECURITY TECHNIQUES

Figure 4:
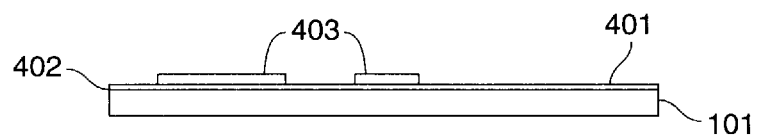
FIG. 4 shows a top layer applied to the face of a document.

FIG. 4 shows a top layer applied to the face of a document.

Additional security techniques may be combined with the area 102 printed using the gradient print screen 201 and with the moiré pattern 306, printed using constant print screens, gradient print screens, or both.

The document 101 generally comprises a face 401 with a top layer 402. In a preferred embodiment, the area 102 or the moiré pattern 306, or both, may be covered with a layer 403 of matte varnish or transparent white ink. Matte varnish and transparent white ink are known in the art, and are known to degrade the performance of color copiers and color scanners. Alternatively, the transparent white ink may be fluorescent in one or more frequencies, so that a color copier or a color scanner will have an excess of that color in the region where the transparent white ink is printed.

In a preferred embodiment, a set of colors for printing may avoid common printing ink colors, may prefer yellow, light green, or light blue, and may avoid red, purple, or violet, to raise the difficulty in copying by color copiers or color scanners. For example, in a preferred embodiment, the colors shown in table 4-1 may be preferred and the colors shown in table 4-2 may be avoided.

TABLE 4-1

Pantone Transparent Yellow
Pantone Opaque Green
Pantone Process Cyan [transparent, not opaque]

TABLE 4-2

Pantone Red (Warm Red, Rubine Red, Rhodamine Red)
Pantone Purple
Pantone Violet

The colors shown in tables 4-1 and 4-2 may be found in the "Pantone Color Formula Guide" (available from Pantone Corporation of Moonachie, N.J.), hereby incorporated by reference as if fully set forth herein.

In a preferred embodiment, a process for printing multiple colors may resemble the known four color printing process, except that the standard colors for four color printing are specifically avoided. A preferred set of colors for printing using a method similar to four color printing includes black, Pantone Transparent Yellow in place of Pantone Process Cyan, and Pantone Process Cyan in place of Pantone Process Yellow; a magenta place is not used.

Those skilled in the art would recognize, after perusal of this application, that other colors may be substituted for the standard four color printing color set, that such other colors would be workable, and are within the scope and spirit of the invention. For example, two different yellows could be used in place of the cyan and yellow plates, or entirely different colors having nothing to do with the black, cyan, magenta, and yellow color set could be used.

EXAMPLE DOCUMENT

An example check embodying the invention is enclosed. It is an integral part of this specification and is hereby incorporated by reference as if fully set forth herein.

Alternative Embodiments

While preferred embodiments are disclosed herein, many variations are possible which remain within the concept and scope of the invention, and these variations would become clear to one of ordinary skill in the art after perusal of the specification, drawings and claims herein.

I claim:

1. A document comprising:

first area printed with color dots in a first gradient print pattern that exceeds resolutions available on commonly available color copiers and color scanners; and a second area printed with color dots in a second gradient print pattern, said second area overlapping said first area and said second gradient print pattern being aligned at an angle from said first gradient print pattern.

2. A document comprising:

a first area printed with color dots in a first gradient print pattern that exceeds resolutions available on commonly available color copiers and color scanners; and a second area printed with color dots in a second gradient print pattern, said second area overlapping said first area and said second gradient print pattern being aligned at an angle from said first gradient print pattern, said angle being between about 2 to 13 degrees greater than a multiple of 15 degrees.

3. A document comprising:

a first area printed with color dots in a gradient print pattern that exceeds resolutions available on commonly available color copiers and color scanners; and a second area printed with a moiré pattern;

wherein said first area and said second area at least partially overlap; and wherein said moiré pattern comprises a print pattern and a gradient angle print pattern at an angle thereto, said angle being between about 2 to 13 degrees greater than a multiple of 15 degrees.

4. A document comprising:

a first area printed with color dots in a gradient print pattern that exceeds resolutions available on commonly available color copiers and color scanners; and a second area printed with a moiré pattern:

wherein said first area and said second area at least partially overlap; and wherein said moiré pattern comprises a print pattern and a gradient print pattern at an angle thereto, said angle being between about 2 to 13 degrees greater than a multiple of 15 degrees.

\* \* \* \* \*